US009415530B2

(12) United States Patent
Fukuda et al.

(10) Patent No.: US 9,415,530 B2
(45) Date of Patent: Aug. 16, 2016

(54) METHOD OF PRODUCING UNIFORM POLYMER BEADS OF VARIOUS SIZES

(75) Inventors: Junji Fukuda, Tokyo (JP); Adrian Burt, South Wales (GB); Serguei Rudolfovich Kosvintsev, Pontypridd (GB)

(73) Assignee: Purolite Corporation, Bala Cynwyd, PA (US)

( * ) Notice: Subject to any disclaimer, the term of this patent is extended or adjusted under 35 U.S.C. 154(b) by 754 days.

(21) Appl. No.: 13/345,244

(22) Filed: Jan. 6, 2012

(65) Prior Publication Data

US 2012/0175798 A1   Jul. 12, 2012

Related U.S. Application Data

(60) Provisional application No. 61/430,748, filed on Jan. 7, 2011.

(51) Int. Cl.
| | | |
|---|---|---|
| *C08F 2/00* | (2006.01) | |
| *B01F 3/08* | (2006.01) | |
| *B29B 9/10* | (2006.01) | |
| *B01F 11/00* | (2006.01) | |
| *B29B 9/12* | (2006.01) | |

(52) U.S. Cl.
CPC ............ *B29B 9/10* (2013.01); *B01F 3/0819* (2013.01); *B01F 3/0865* (2013.01); *B01F 11/0082* (2013.01); *B29B 2009/125* (2013.01)

(58) Field of Classification Search
USPC ............................. 526/88; 521/29, 33, 31, 38
See application file for complete search history.

(56) References Cited

U.S. PATENT DOCUMENTS

| | | | |
|---|---|---|---|
| 2,694,700 | A | 11/1954 | Shanta |
| 3,728,318 | A | 4/1973 | Hamann et al. |
| 3,862,961 | A | 1/1975 | Sheng et al. |
| 4,444,961 | A | 4/1984 | Timm |
| 4,623,706 | A | 11/1986 | Timm et al. |
| 4,666,673 | A | 5/1987 | Timm |
| 6,221,926 | B1 | 4/2001 | Oohara et al. |
| 7,727,555 | B2 | 6/2010 | DiCarlo et al. |
| 9,028,730 | B2 | 5/2015 | Kosvintsev |
| 2008/0154007 | A1 | 6/2008 | Mori et al. |
| 2009/0062407 | A1 | 3/2009 | Iversen et al. |
| 2009/0166291 | A1 | 7/2009 | Jackson |
| 2009/0176897 | A1 | 7/2009 | Finch et al. |
| 2009/0281272 | A1 | 11/2009 | Yilmaz et al. |
| 2010/0103769 | A1 | 4/2010 | Bachman et al. |
| 2012/0175798 | A1 | 7/2012 | Fukuda et al. |

FOREIGN PATENT DOCUMENTS

| | | |
|---|---|---|
| DE | 102004040735 | 3/2006 |
| GB | 2 385 008 B † | 10/2005 |
| GB | 2 444 035 A † | 5/2008 |
| GB | 2467925 | 8/2010 |
| JP | 2007-23141 | 2/2007 |
| JP | 2007-131668 | 5/2007 |
| JP | 2009-161737 | 7/2009 |
| JP | 2010-540714 | 12/2010 |
| WO | WO 01/45830 | 6/2001 |
| WO | WO 2007/144658 | 12/2007 |
| WO | 2009/040826 | 4/2009 |

OTHER PUBLICATIONS

Dowding et al., Production of porous suspension polymer beads with a narrow size distribution using a cross-flow membrane and a continuous tubular reactor, colloids and surfaces A:physicochemical and engineering aspects 180 (2001) 301-309.*
An International Search Report and Written Opinion, mailed Aug. 30, 2012, which issued in corresponding International Application No. PCT/US2012/020484.
Office Action for Japanese Patent Application No. 2013-548577 dated Nov. 25, 2015 (with English translation).
Ma, G. et al., Preparation of uniform-sized polystyrene-polyacrylamide composite microspheres from a w/o/w emulsion by membrane emulsification technique and subsequence suspension polymerization, Macromolecules, 2004, 37:2954-2964.
Extended European Search Report issued in EP Application No. 12732052.1, dated Jul. 25, 2014, 12 pages.
Dowding, P.J. et al 2001, "Production of porous suspension polymer beads with a narrow size distribution using a cross-flow membrane and a continuous tubular reactor", vol. 18, pp. 301-309.†
Holdich, R.G. et al 2010, "Membrane emulsification with oscillating and stationary membranes", Industrial and Engineering Chemistry Research, vol. 49, pp. 3810-3817.†
Malik, D.J. et al 2009, "Synthesis and characterisation of size-selective nanoporous polymeric adsorbents for blood purification", Separation and purification technology, vol. 66, 578-585.†
Omi, S. et al 1994, "Synthesis of polymeric microspheres employing SPG emulsification technique", Publication from the Department of Chemical Engineering, Tokyo, pp. 1-11.†
"Particles," Jul. 30, 2013, Micropore Technologies'Website, 3 pages.†
Schadler, V. & Windhab, E.J. 2006, "Continuous membrane emulsification by using a membrane system with controlled pore distance", Desalination, vol. 189, No. 1-3, pp. 130-135.†

(Continued)

*Primary Examiner* — Mary F Theisen (74) *Attorney, Agent, or Firm* — Fish & Richardson P.C.

(57) ABSTRACT

Speriodal polymer beads having a uniform size are prepared by polymerizing uniformly sized monomer droplets formed by dispersing a polymerizable monomer phase over a cross-flow membrane into an aqueous phase. A shear force is provided at a point of egression of the polymerizable monomer phase into the aqueous phase, the direction of shear substantially perpendicular to the direction of egression of the monomer phase. The polymer beads can be employed in applications where beads having uniform diameters of 10 to 180 μm are useful.

18 Claims, 4 Drawing Sheets

(56) References Cited

OTHER PUBLICATIONS

Vladisavljevic, G.T. & Williams, R.A. 2006, "Manufacture of large uniform droplets using rotating membrane emulsification", Journal of colloid and interface science, vol. 299, No. 1, pp. 396-402.†

Vladisavljevic, G.T. & Williams, R.A. 2005, "Recent developments in manufacturing emulsions and particulate products using membranes", Advances in colloid and interface science, vol. 113, pp. 1-20.†

Wolska, J. & Bryjak, M. 2009, "Preparation of poly(styrene-co-divinylbenzene) microspheres by membrane emulsification", vol. 241, No. X. pp. 331-336.†

"wow for healthy eating," www.tcetoday.com, Mar. 2010, 1 page.†

Yuyama, H. et al. 2000, "Preparation and analysis of uniform emulsion droplets using SPG membrane emulsification technique", Colloids and Surfaces A: Physicochemical and Engineering Aspects, vol. 168, pp. 159-174.†

\* cited by examiner
† cited by third party

FIG. 4 ively insoluble. The dispersed monomer droplets are subsequently polymerized under continuous agitation (see, for example, U.S. Pat. Nos. 3,728,318; 2,694,700; and 3,862,924). Polymer beads are also manufactured by "jetting" liquid organic monomer mixtures through capillary openings into an aqueous phase. The suspended monomer droplets are then transported to a reactor where polymerization occurs, as described, for example, in U.S. Pat. Nos. 4,444,961; 4,666,673; and 4,623,706.

METHOD OF PRODUCING UNIFORM POLYMER BEADS OF VARIOUS SIZES

FIELD OF THE INVENTION

The present invention relates generally to the preparation of small spheroidal polymer beads, and more particularly, to the preparation of spheroidal polymer beads having a substantially uniform particle size. Such beads are useful in the manufacture of ion exchange resins.

BACKGROUND OF THE INVENTION

Polymer beads can be prepared by suspension polymerization by dispersing an organic monomer phase as droplets in a vessel equipped with an agitator and an aqueous phase in which the monomer and resulting polymer are essentially insoluble. The dispersed monomer droplets are subsequently polymerized under continuous agitation (see, for example, U.S. Pat. Nos. 3,728,318; 2,694,700; and 3,862,924). Polymer beads are also manufactured by "jetting" liquid organic monomer mixtures through capillary openings into an aqueous phase. The suspended monomer droplets are then transported to a reactor where polymerization occurs, as described, for example, in U.S. Pat. Nos. 4,444,961; 4,666,673; and 4,623,706.

The conventional methods described above often produce bead products exhibiting large particle size distributions, primarily due to problems of coalescence of the suspended monomer droplets. Accordingly, it is desirable to provide a method for preparing uniform dispersed polymer beads whereby the deficiencies associated with conventional methods can be avoided.

SUMMARY OF THE INVENTION

An object of the invention is to provide a simple method for preparing uniform sized spheroidal polymer beads having a narrow particle size distribution.

Accordingly, one embodiment of the invention is directed to a method for preparing uniform spheroidal polymer beads having a volume mean particle diameter ($D_{50}$) of about 10 to about 180 μm. The method includes providing an apparatus having a metallic membrane containing through holes. A first volume is in contact with a first side of the membrane and a second volume is in contact with a second side of the membrane. The first volume includes a polymerizable monomer phase. The second volume includes a suspension phase immiscible with the polymerizable monomer phase. The first volume is dispersed through the through holes into the second volume under conditions sufficient to form monomer droplets of the polymerizable monomer. A shear force is provided at a point of egression of the first volume into the second volume. The direction of shear is substantially perpendicular to the direction of egression of the first volume. The monomer droplets dispersed in the second volume are then polymerized, forming the desired polymer beads.

In another embodiment, the invention provides a polymerization product in the form of polymer beads having a particle size of about 10 to about 180 μm wherein at least about 90 percent of the beads possess a particle size from about 0.9 to about 1.1 times the average particle size of the beads.

In yet another embodiment of the invention, the polymer beads exhibit a coefficient of variance (CV) of less than about 0.15.

Additional advantages, objects, and features of the invention are set forth in part in the description which follows and will become apparent to those having ordinary skill in the art.

BRIEF DESCRIPTION OF THE DRAWINGS

Non-limiting and non-exhaustive embodiments of the present invention are described with reference to the following drawings. For a better understanding of the present invention, reference will be made to the following Detailed Description, which is to be read in association with the accompanying drawings, wherein.

DETAILED DESCRIPTION

It is understood that the invention(s) described herein is (are) not limited to the particular methodologies, protocols, and reagents described, as these may vary. It is also to be understood that the terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs. Any methods and materials similar or equivalent to those described herein can be used in the practice or testing of the present invention.

All publications, including all patents, patent applications and other patent and non-patent publications cited or mentioned herein are incorporated herein by reference for at least the purposes that they are cited; including for example, for the disclosure or descriptions of methods of materials which may be used in the invention. Nothing herein is to be construed as an admission that a publication or other reference (including any reference cited in the "Background of the Invention" section alone) is prior art to the invention or that the invention is not entitled to antedate such disclosure, for example, by virtue of prior invention.

The skilled artisan will appreciate that the numerical values presented herein are approximate values. Generally, unless otherwise indicated, terms such as "about" and "approximately" include within 20% of the values indicated, more preferably within 10% and even more preferably within 5%.

Surprisingly, by the practice of the present invention, exceptionally uniform monomer droplets can be produced. Upon polymerization, the uniform droplets are then formed into unexpectedly uniform polymer particles. For example, in one embodiment, the present invention provides spheroidal polymer particles having a volume average particle diameter (i.e., the mean diameter based on the unit volume of the particle) between about 1 μm to about 250 μm. Unless otherwise stated, the terms "polymer particle," "polymer bead," or "bead," or grammatical equivalents thereof, refers to any spherical polymeric material where the spherical shape is formed during a polymerization reaction, i.e. the bead is created in situ. This term does not include spherical polymeric material where the spherical shape is created by mechanical means after the polymerization reaction is completed. The average volume diameter of the polymer bead of the invention is preferably between about 1 µm and about 200 µm, more preferably between about 10 to about 180 µm, or about 35 to about 150 µm with additional preferred ranges of between about 40 µm to about 120 µm, about 50 to about 100 µm, or about 55, 60, 65, 70, 75, 80, 85, 90, or about 95 µm. The volume average particle diameter can be measured by any conventional method, for example, using optical imaging, laser diffraction or elecrozone sensing. In one embodiment, the particle diameter is preferably measured using optical microscopy.

In another embodiment, the polymer beads are exceptionally uniform having a coefficient of variation (i.e., the standard deviation of the population divided by the population mean) of less than about 30% or about 1, 2, 3, 4, 5, 6, 7, 8, 9, 10, 11, 12, 13, 14, 15, 20, 25, 26, 27, 28 or about 29%. A coefficient of variation of less than about 15% is preferred. In another embodiment of the invention, about 90 percent of the beads possess a volume particle diameter from about 0.90 and about 1.1 times the average volume particle diameter of the beads.

Figure 1:
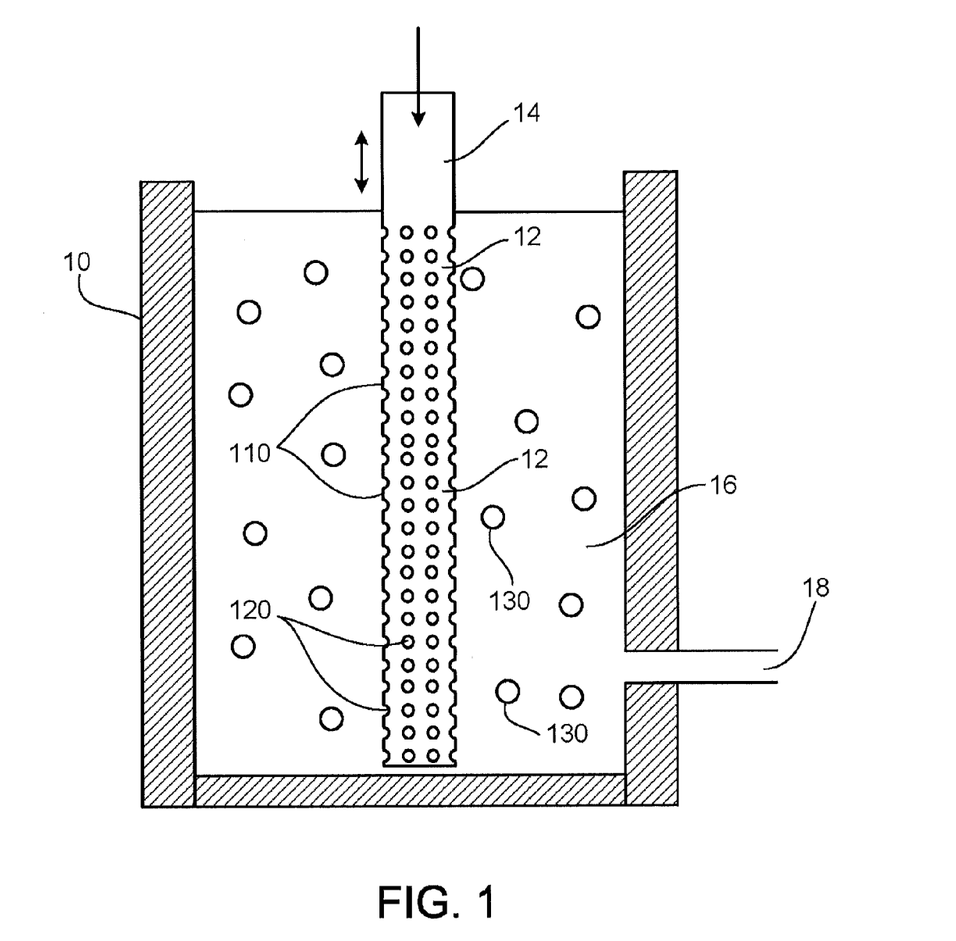
FIG. 1 is a schematic showing a cross-flow membrane apparatus of the present invention.

FIG. 1 depicts an apparatus 10 useful for preparing uniformly sized spheroidal polymer beads of the invention. As illustrated, apparatus 10 includes a monomer phase 12 containing a polymerizable monomer. The monomer reservoir is in fluid communication with a source of monomer (not shown) by means of a monomer feed conduit 14. Apparatus 10 also includes a suspension liquid phase 16 of a suspension medium containing a liquid immiscible with the monomer or monomer phase 12. Suspension phase 16 is in fluid communication with a source (not shown) by means of a suspending liquid supply conduit 18.

A monomer droplet forming device such as candle-type (e.g., cylindrical shaped) membrane 110 is in direct contact with monomer phase 12 and suspension phase 16. Membrane 110 contains through holes 120 connecting the monomer and suspension phases. Membrane 110 is also equipped with a means such as a variable-frequency/amplitude vibrator or oscillator (not shown) for displacing or vibrating the membrane perpendicular to the direction of liquid flow through the through holes 120. The monomer phase is directed into membrane 110 through conduit 14 by means of, e.g., a pulseless pump (i.e., syringe of a gear pump) or under pressure from the pressurized monomer tank to form a plurality of monomer droplets 130 comprising the polymerizable monomer.

Figure 2:
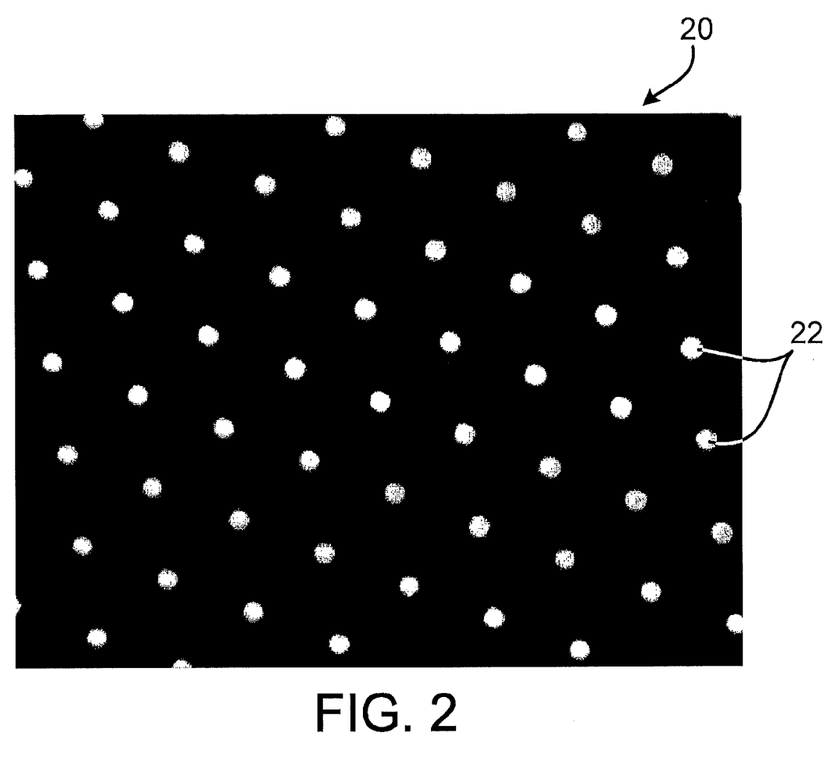
FIG. 2 is a micrographic image of a membrane of the invention.

FIG. 2 is a micrographic image of a membrane 20 of the present invention. In this embodiment, the membrane is composed of nickel and contains a plurality of 20 µm through holes 22.

Membrane 110 in FIG. 1 may be composed of any material capable of having a plurality of holes that are suitable for "jetting" a liquid organic monomer phase into an aqueous phase. Suitable membranes for use in this invention are disclosed, for example, in International Publication No. WO 2007/144658, which is incorporated herein by reference in its entirety. Membranes containing a metal are preferred. In one embodiment, the membrane is substantially metallic, or wholly metallic. According to another embodiment, the membrane is a chemically-resistant metal such as nickel or steel. In yet another embodiment, the metallic membrane is pretreated with a chemical reagents (e.g., sodium hydroxide and/or an inorganic acid) to remove surface oxide layers.

Figure 4:
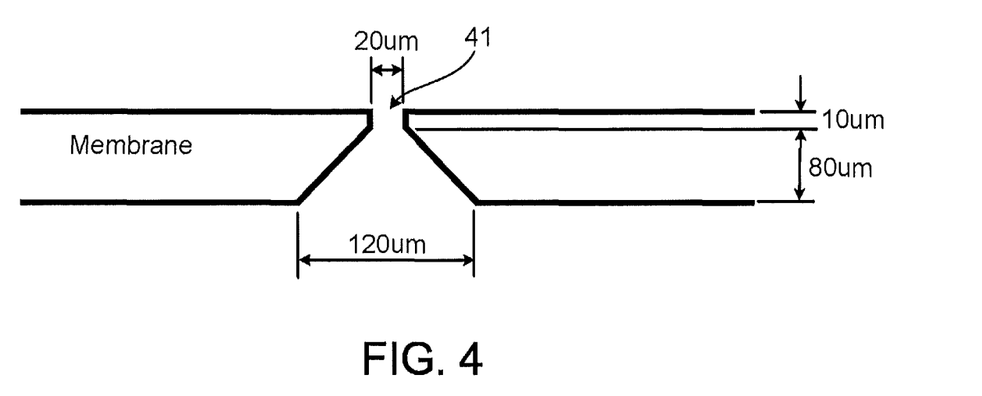
FIG. 4 is a schematic illustrating a membrane through hole of the invention.

According to one embodiment of the invention, the membrane contains a plurality of through holes. In this embodiment, the membrane comprises about 2,500 to about 12,000 per cm² through holes throughout its surface. The shape of the membrane through holes may vary. For example, the shape of the through holes can be cylindrical, or conical, preferably conical. FIG. 4 is a schematic illustrating preferred conical-shaped membrane through hole 41 of the invention. In another embodiment, the through holes are in the shape of a slot. In this embodiment, the slot comprises an aspect ratio of slot width to slot length of at least 1:2. The aspect ratio of slot width to slot length may be in the range of 1:5 to 1:100, or 1:10 to 1:100, or 1:20 to 1:100, or 1:30 to 1:100, or 1:40 to 1:100, or 1:50 to 1:100, or 1:60 to 1:100, or 1:70 to 1:100, or 1:80 to 1:100, or 1:90 to 1:100. The membrane holes may be fabricated by any conventional method. For example, the membrane holes may be fabricated by drilling, laser treating, electro-formed, or water jetting the membrane. The membrane holes are preferably electro-formed by electroplating or electroless plating of nickel on a suitable mandrel. In another embodiment, the membrane holes are perpendicular to the surface. In another embodiment, the membrane holes are positioned at an angle, preferably at an angle from 40 to 50 degrees.

The shape of the membrane may vary. In one embodiment, the membrane may be in the form of a candle, double-walled can, spiral wound, or flat. In another embodiment, the membrane is preferably in the form of a double walled can.

In one embodiment of the invention, the overall diameter of membrane 110 is in the range of from about 2 to about 30 cm, or about 3, 4, 5, 6, 7, 8, 9, 10, 11, 12, 13, 14, 15, 16, 17, 18, 19, 20, 21, 22, 23, 24, 25, 26, 27, 28, or 29 cm. In another embodiment, a membrane size is preferably 3×3, 4×4, 5×4 or 8×4 cm (L/d).

In yet another embodiment, the overall thickness of the membrane wall is in the range of about 0.01 to about 100 mm, or about 0.01, 0.05, 0.1, 0.2, 0.3, 0.4, 0.5, 0.6, 0.7, 0.8, 0.9, 1.0, 5.0, 10, 15, 20, 25, 30, 35, 40, 45, 50, 55, 60, 65, 70, 75, 80, 85, 90, or about 95 mm. In a preferred embodiment, the membrane thickness is about 0.5 to about 20 mm.

In one embodiment of the invention, the monomer phase includes one or more polymerizable monomers which form a discontinuous monomer droplet phase when dispersed throughout the suspension medium. Polymerizable monomers employed in the practice of this invention include polymerizable monomers, or mixtures of two or more copolymerizable monomers wherein the monomers are substantially insoluble in an aqueous liquid phase. Monomers, such as acrylonitrile, having only limited miscibility in water can also be employed. Advantageously, the polymerizable monomers are monomers polymerizable using suspension polymerization techniques. Such monomers are well known in the art and are described in, for example, E. Trommsdoff et al., *Polymer Processes*, 69-109 (Calvin E. Schildknecht, 1956). In particular, water-insoluble monomers of the invention may include monovinylidene aromatics such as styrene, vinyl naphthalene, alkyl substituted styrenes (particularly monoalkyl substituted styrenes such as vinyltoluene and ethyl vinylbenzene) and halo-substituted styrenes such as bromo- or chlorostyrene, polyvinylidene aromatics such as divinylbenzene, divinyltoluene, divinyl xylene, divinyl naphthalene, trivinylbenzene, divinyl diphenyl ether, divinyl diphenyl sulfone and the like; halo olefins, particularly the vinyl halides such as vinyl chloride; esters of α, β-ethylenically unsaturated carboxylic acids, particularly acrylic or methacrylic acid, such as methyl methacrylate and ethyl acrylate; vinyl acetate, and mixtures thereof. Monovinylidene aromatics, particularly styrene or a mixture of styrene with a monoalkyl substituted styrene; polyvinylidene aromatics, particularly divinylbenzene; esters of α,β-ethylenically unsaturated carboxylic acid, particularly methyl methacrylate or combinations thereof, such as mixtures of styrene and divinylbenzene or styrene, divinylbenzene and methyl methacrylate are preferred.

In one embodiment, preferred monomer mixtures include styrene and divinyl benzene, alone or in combination with a porogen. As used herein, the term "porogen" is defined as a material that is capable of forming pores. Suitable porogens include, for example, aliphatic alcohols such as methyl isobutyl carbinol and isobutyl alcohol.

Water soluble polymerizable monomers are also included in the scope of the present invention. For example, the invention contemplates the use of monomers that form an aqueous solution in water, where the resulting solution is sufficiently insoluble in one or more other suspension liquids, generally a water-immiscible oil or the like, such that the monomer solution forms droplets upon its dispersion in the liquid. Representative water soluble monomers include monomers which can be polymerized using conventional water-in-oil suspension (i.e., inverse suspension) polymerization techniques such as described by U.S. Pat. No. 2,982,749, including ethylenically unsaturated carboxamides such as acrylamide, methacrylamide, fumaramide and ethacrylamide; aminoalkyl esters of unsaturated carboxylic acids and anhydrides; ethylenically unsaturated carboxylic acids, e.g., acrylic or methacrylic acid, and the like. Preferred monomers for use herein are ethylenically unsaturated carboxamides, particularly acrylamide, and ethylenically unsaturated carboxylic acids, such as acrylic or methacrylic acid.

The amount of monomer present in the monomer phase will vary. In one embodiment, the monomer phase comprises sufficient liquid to solubilize the monomer. In another embodiment, the monomer comprises less than about 50 weight percent of the total monomer dispersed in the aqueous phase. Preferably, the monomer comprises from about 30 to 50 weight percent of the monomer dispersed in the aqueous phase for gel polymers. In another embodiment when a porogen is present, the monomer comprises less than about 30 weight percent of the total monomer/aqueous phase. Preferably, the monomer comprises from about 20 to 35 weight percent of the monomer dispersed in an aqueous phase for macroporous polymer.

Although the monomers can be polymerized using free radical initiation by UV light or heat, or a combination of these methods, chemical radical initiators are preferably used in the present invention. For example, monomer-soluble free radical initiators such as peroxygens, (e.g., benzoyl peroxide, or azobisisobutyronitrile) are advantageously employed in conjunction with water-insoluble monomers. Free radical initiators such as persulfates, hydrogen peroxides or hydroperoxides can also be used. Typically, the ratio of organic initiator to dry monomer is about 0.1 to about 8%, or about 0.5 to about 2% by weight, preferably about 0.8 to about 1.5% by weight.

Conventional polymerization aids, e.g., chain transfer agents, chelating agents and the like, can also be included within the monomer phase. Pore-forming materials, i.e., those materials which impart a porous structure to the resulting polymer beads, such as aliphatic hydrocarbons such as hexane, toluene and isooctane, and the like, can also be included in the monomer phase.

The suspension phase is a medium containing a suspending liquid immiscible with the polymerizable monomer or monomer phase. Typically, the suspension phase comprises water or mixtures of water with one or more water-miscible organic liquids such as lower alkyl alcohols such as methanol or butanol. Preferably, water is used as the suspending liquid. Alternatively, when the monomer phase comprises a water-soluble monomer, a water-immiscible oil is used as the suspension phase. Such water-immiscible oils include, but are not limited to, halogenated hydrocarbons such as methylene chloride, liquid hydrocarbons, preferably having about 4 to about 15 carbon atoms, including aromatic and aliphatic hydrocarbons, or mixtures thereof such as heptane, benzene, xylene, cyclohexane, toluene, mineral oils and liquid paraffins.

The viscosity of the suspension phase is advantageously selected such that the monomer droplets can easily move throughout the suspension phase. In general, droplet formation is readily achieved, and movement of the droplets throughout the suspension medium is facilitated, when the viscosity of the suspension phase is substantially similar to (e.g., of the same order of magnitude) as the viscosity of the monomer phase. The viscosity of the suspension medium can vary according to the size of the monomer droplets to be formed. Large monomer droplets move more readily through the suspension medium than do smaller monomer droplets. Accordingly, a higher viscosity suspension phase may be employed for the preparation of larger monomer droplets. Preferably, the suspension medium has a viscosity of less than about 50 centipoise units (cps) at room temperature. Viscosity values of less than 10 cps are preferred. In one embodiment, the viscosity of the suspension phase is from about 0.1 to about 2 times the viscosity of the monomer phase.

Examples of viscosity modifiers suitable for use in the invention include, but are not limited to, polyvinylalcohol, polyvinylpyrrolidone, polyvinylcaprolactam, polyacrylic acid, polydimethyldiallyl ammonium chloride, hydrolyzed poly(styrene-co-maleic anhydride), and hydrolyzed poly (methylvinylether-co-maleic anhydride).

Typically, the suspension phase also contains a suspending agent. Examples of suspending agents known to those skilled in the art are proteins such as gelatin, soy protein, hydrolyzed soy protein, wheat protein, spirulina, and rice protein; polysaccharides such as hydroxyethylcellulose, methylhydroxyethylcellulose, hydroxypropylmethylcellulose, carboxymethylcellulose, pectin, xanthan gum, gellan gum, sodium lignosulfonate, agar, carrageenan, sodium alginate, starch, gum arabic, and gum tragacanth. Other additives such as surfactants, buffers, and aqueous inhibitors can also be added. The aqueous layer may also include dispersants such as calcium lignosulfonate. Especially preferred suspending agents include, e.g., polyacrylic acid with Type A gelatin, polydimethyldiallylammonium chloride with Type A gelatin, carboxymethyl cellulose, carboxymethylcellulose with hydroxypolyethylene alkylphenol and polyether phosphate ester, hydroxypropyl methylcellulose, hydroxypropyl methylcellulose with hydroxypolyethylene alkylphenol and polyether phosphate ester, and methylhydroxyethylcellulose. Preferably, the total amount of suspending agent in the aqueous phase is from 0.05% to 1%, and more preferably, from 0.05% to 0.5%.

In one embodiment of the invention, the polymerizable monomer droplets are formed by dispersing the monomer phase through the plurality of through holes of the membrane into the suspension phase. The monomer flow rates through the membrane can vary from 1 ml/hr/cm$^2$ of membrane to 50 ml/hr/cm$^2$ of membrane, and are typically from 5 ml/hr/cm$^2$ of membrane to 15 ml/hr/cm$^2$ of membrane. The monomer droplets may be directed into the suspension phase by pumping or applying a pressure to the first volume, preferably pumping. In one embodiment, the applied pressure is in the range of 0.01 to 1 bar and preferably 0.1 to 0.5 bar. In another embodiment, a piston, or similar means such as a diaphragm is used for directing the monomer phase into the suspension.

In one embodiment, a shear force is provided across the membrane at a point of egression of the monomer phase into the suspension phase. Without being bound by theory, the shear force is thought to interrupt the monomer flow through the membrane creating droplets. In this embodiment, the shear force may be provided by rapidly displacing the membrane by vibrating, rotating, pulsing or oscillating movement. In another embodiment, the direction of shear is substantially perpendicular to the direction of egression of the monomer phase. In another embodiment, the frequency of vibration of the membrane can be from 10 Hz to 20,000 Hz using commercially available vibratory exciters, and as high as 500,000 Hz if piezoelectric exciters are used. Typical frequencies of vibration are from 10 Hz-100 Hz. Suitable amplitude values are in the range of about 0.1 to about 5 mm, or about 0, 0.2, 0.4, 0.6, 0.8, 1.0, 1.2, 1.3, 1.4, 1.5. 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8 or 4.9 mm. The shear force can be applied in any direction relative to the slot or across the slot, preferably across the slot.

In one embodiment, the droplets are jetted into a suspension phase in a formation column, and then transported through a transfer line, or conduit, to a reactor such as to minimize droplet coalescence or breakage. In another embodiment, the volume fraction of the droplets exiting the formation column is at least 1%, or at least 25, 30, 35, 40, 45, 50%, 55, 60, 65, 70%. Preferably, the volume fraction is no greater than 60%, alternatively no greater than 50%, alternatively no greater than 48%, alternatively no greater than 45%, alternatively no greater than 40%, alternatively no greater than 37%, most preferably 30, 31, 32, 33, 34, 35, 36, 37 or 38%. Close packing of uniform spherical droplets, corresponding to a 60% or greater volume fraction typically causes coalescence and poor product quality.

In one embodiment, polymerization of the monomer droplets occurs once the droplets are transferred to a polymerization reactor. The reaction conditions can be modulated as necessary to achieve optimal product yield. In one embodiment, the polymerization occurs at a temperature range of about 20 to about 120° C., preferably at a temperature of about 20, 25, 30, 35, 40, 45, 50, 55, 60, 65, 70, 75, 80, 85, 90, 95, or 100° C. A reaction temperature of about 60 to 90° C. is preferred. In another embodiment, the duration of the polymerization reaction is about 1 to about 24 hours, or 2, 3, 4, 5, 6, 7, 8, 9, 10, 11, 12, 13, 14, 15, 16, 17, 18, 19, or 20 hours. In yet another embodiment, the polymerization is carried out at a pressure range of about 1 to 2 bar.

Various reagents may be added to the reactor to facilitate the polymerization step. For example, coalescence preventers such as sodium nitrite, sodium dichromate, methylene blue and/or alkali metal iodides may be added to the polymerization reaction mixture.

Figure 3:
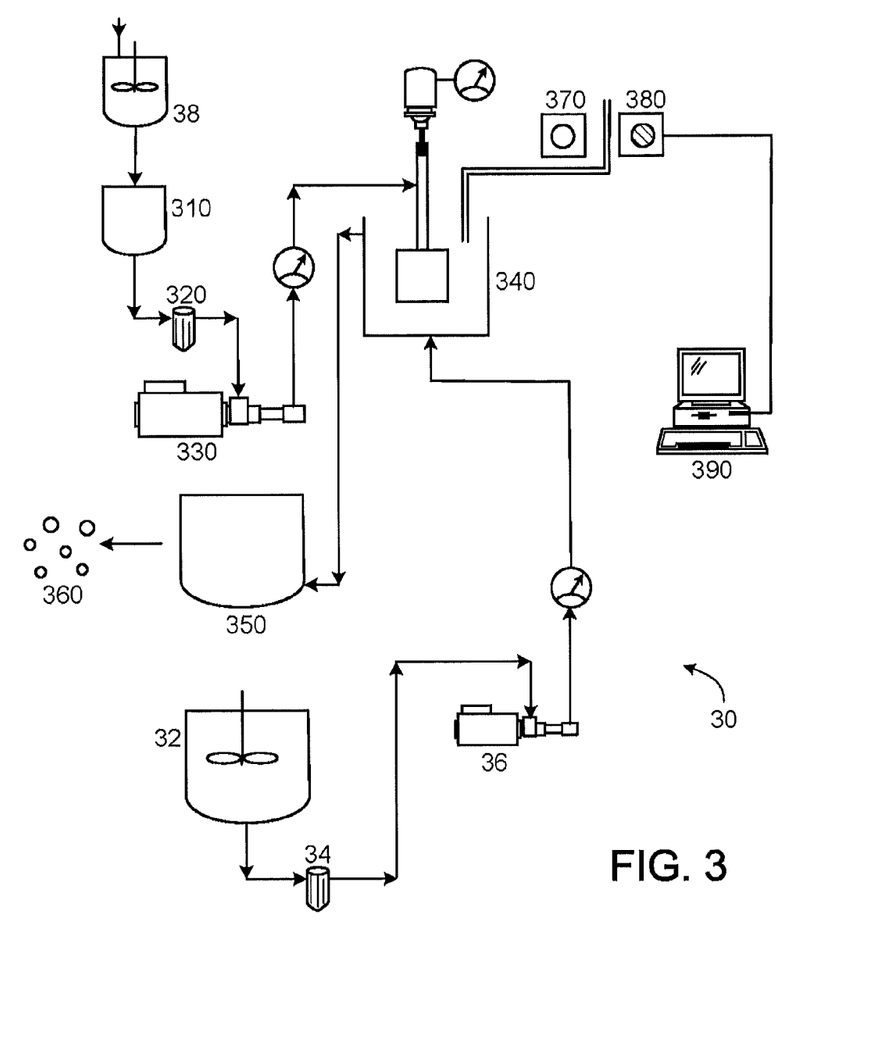
FIG. 3 is a plan view illustrating an apparatus for preparing uniform polymer bead particles of the invention.

FIG. 3. is a plan view illustrating an apparatus 30 for preparing the polymer bead particles of the present invention. First, an aqueous phase comprising, e.g., a colloidal stabilizer and a viscosity modifier is added to aqueous feed tank 32 and mixed under agitation. The mixing temperature can range from 0 to 85° C., preferably from 20 to 85° C., more preferably from 70 to 85° C. The aqueous phase is then fed into the formation column of droplet generator 340. The monomer phase which contains, e.g., at least one polymerizable monomer, is prepared in monomer mix tank 38 under agitation. The mixing temperature can range from 0 to 85° C., preferably from 20 to 85° C., more preferably from 70 to 85° C. The monomer solution is then transferred into feed tank 310 where it is subjected to filtration over filter 320 and applied to metering pump 330. The monomer solution is then injected into droplet generator 340 using a controlled flow rate through a first side of metallic membrane 20 shown in FIG. 1. The monomer droplets are then directed to polymerization reactor 350 for the polymerization reaction step. The final bead particles 360 are then collected upon isolation from the aqueous phase. As shown in FIG. 4, features of the monomer droplets that are produced in droplet generator 340 can be analyzed using an optical camera particle counter 380. Apparatus 30 can also be configured with conventional computer software 390 for particle characterization.

Using the techniques described above, uniform polymer bead particles have been prepared. Although droplets are known to collide with one another immediately after formation during suspension polymerization, the droplets prepared as described herein unexpectedly exhibit minimum coalescence, and spheroidal beads having unexpectedly uniform polymer size can be prepared. Further, it was surprisingly discovered that a wide range of droplet sizes can be produced from a single membrane by modulating parameters such as frequency and amplitude of the membrane. Without being bound by theory, it is believed that the utilization of the metallic cross flow membrane described herein contributes to advantageous features such as uniform droplet formation with less coalescence and or droplet breakage. Further, it has been surprisingly discovered that providing a shear force substantially perpendicular to the direction of egression of the monomer prevents blocking by inclusions in the through holes, thus facilitating uniform production of monomer droplets. The perpendicular shear also provides low energy consumption and prevents air bubble formation and blockage of membrane during droplet formation. Accordingly, the inventive apparatus is able to operate without disruption for an extended period of time.

Upon completion of polymerization, the resulting polymer beads can be further processed and converted to ion exchange resins using techniques well known in the art for converting aromatic polymers to such resins. Generally, anion resins are prepared by haloalkylating the polymer and subsequently attaching anion active exchange groups to the haloalkylated polymer as described, for example, in U.S. Pat. Nos. 2,642, 417; 2,960,480, 2,597,492; 2,597,493; 3,311,602; and 2,616, 877. Methods for converting polymer beads to cationic resins include sulfonating the polymer using sulfuric or chlorosulfuric acid or sulfur trioxide. Such methods are illustrated in U.S. Pat. Nos. 3,266,007; 2,500,149; and 2,631,127.

Moreover, the spheroidal polymer beads prepared by the method of the invention exhibit other properties desired of polymers prepared in bead form. For example, the beads can be functionalized to include unique chemical groups. In particular, isolated bead particles can be reacted under Friedel-Crafts reaction conditions to form alkylated or acylated bead products.

The method and compositions of the present invention are useful in the preparation of uniform sized spheroidal polymer particles from polymerizable monomers, particularly monomers that are polymerizable using suspension polymerization techniques. The method is particularly useful in the preparation of uniform polymer beads having an average particle diameter in the range of about 5 to about 100 μm. The polymer beads prepared using the method of the invention are useful for chromatographic applications, as substrates for ion exchange resins, as seeds for the preparation of larger uniform polymer particles, as well as other uses.

The following examples serve to more fully describe the manner of using the above-described invention, as well as to set forth the best modes contemplated for carrying out various aspects of the invention. It is understood that these examples in no way serve to limit the scope of the invention, but rather are presented for illustrative purposes.

EXAMPLES

Example 1

Preparation of Uniform Macroporous Polymer Beads

120 μm Volume Ave. Diameter

Polymer beads of uniform particle size were manufactured using the apparatus configuration shown in FIG. 1. An aqueous phase was prepared at neutral pH with a viscosity of 1 to 1.5 centipoise containing:

| | |
|---|---|
| Distilled water | 1 kg |
| Polyvinyl alcohol | 5 g |
| Salt (NaCl) | 20 g |

The aqueous solution of polyvinyl alcohol and salt specified above was added to the aqueous feed tank 32 and mixed at room temperature under agitation.

A monomer phase was prepared containing:

| | |
|---|---|
| Divinylbenzene (80%) | 0.4 kg |
| Methyl isobutyl ketone | 0.5 g |
| Tert-butylperoxy-2-ethyl hexanoate | 4 g |

The monomer phase comprising divinylbenzene, methyl isobutyl ketone and tert-butylperoxy-2-ethyl hexanoate was prepared in monomer mix tank 38 under agitation. The monomer phase was then fed to the droplet generator at a flow rate of 50 ml/minute. The membrane was then vibrated at 18 Hz and a 3 mm peak to peak amplitude.

In this case, the droplet generator consisted of a vertically mounted 3-liter beaker configured with a membrane fixed in the center of the beaker as shown in FIG. 1. The membrane used in this Example was a 4×4 cm (L/d) nickel-based membrane (pure nickel) containing several thousand 16 μm through holes connecting the suspension and monomer phases. The monomer phase was then directed through the membrane into the suspension phase at a rate of 50 ml/min using a gear pump. The membrane was vibrationally excited to a frequency of 18 Hz as the monomer phase was dispersed in the suspension phase, forming a plurality of monomer droplets in the suspension phase. The resultant droplet emulsion was then fed into reactor 350 under agitation sufficient to suspend the droplets without resizing the droplets. The reactor was then heated to a reaction temperature of 80° C. over 10 hours and the droplets polymerized to >95% conversion of monomer to polymer. After separating the polymer beads from the aqueous phase and washing the beads, the following properties were noted: Volume average particle diameter 120 μm, and a uniformity coefficient of 1.15.

The polymer beads were then post-treated by washing with hot distilled water (3× bed volume) and methanol (2× through mesh bed volume; 7× through column bed volume) and were subsequently rinsed with ambient deionized water (2× through column bed volume; 2× through mesh bed volume). The resin was then dry packed through a Buchner apparatus and stored in a solution of ethanol (20%).

The polymer (120 μm) beads were found to exhibit the particle size distribution shown in Table 1. For purposes of comparison, the particle size distribution of spheroidal polymer beads of similar size (Sigma-Aldrich) (Sample No. 1) prepared using conventional emulsion polymerization methods is also set forth in Table 1.

TABLE 1

| | Particle Size Distribution (Volume %) | |
|---|---|---|
| | Emulsion Polymerisation (Sample No. 1) | Example 1 (120 μm) |
| Average Vol. Particle Size | 120 | 120 |
| U.C. D60/D10 | 1.31 | 1.13 |
| U.C. D90/D10 | 1.57 | 1.30 |
| CV(%) | 31 | 22 |

In Table 1, the "D60/D10" Uniformity Coefficient (U.C.) value (i.e., the coefficient related to the size distribution of the polymer bead sample) was obtained by dividing the "D60" particle size in the sample (the particle size where 60% of the particles are a smaller size) by a second particle size, "D10" (where 10% of the particles are a smaller size). The "D90/D10" U.C. value was obtained dividing the "D90" particle size (the particle size where 90% of the particles are a smaller size) by "D10." As evidenced by the particle size distribution recorded in Table 1, the beads prepared by the present invention exhibit excellent uniformity, particularly compared with conventionally prepared beads made by emulsion polymerisation.

Example 2

Preparation of Uniform MacroporousPolymer Beads (150 μm Vol. Ave. Diameter)

In Example 2, the same monomer and aqueous phases and membrane apparatus described in Example 1 were used. The monomer phase was fed to the droplet generator at a flow rate of 50 ml/minute and the membrane was vibrated at 17.5 Hz with a 3 mm peak to peak amplitude. The polymerization and post treatment stages were the same as in Example 1.

Table 2 illustrates the average particle size measurements obtained in for samples prepared in Example 2.

TABLE 2

| | Particle Size Distribution (Volume %) | |
|---|---|---|
| | Emulsion Polymerization (Sample No. 1) | Example 2 (150 μm) |
| Average Vol. Particle Size | 150 | 150 |
| U.C. D60/D10 | 1.32 | 1.12 |
| U.C. D90/D10 | 1.55 | 1.28 |
| CV(%) | 25 | 19 |

As evidenced by the particle size distribution recorded in Table 2, the beads prepared by the present invention exhibit excellent uniformity, particularly compared with conventionally prepared beads made by emulsion polymerization.

Example 3

Preparation of Uniform Macroporous Polymer Beads (75 μm Volume Ave. Diameter)

In Example 3, the same monomer and aqueous phases and membrane apparatus described in Example 1 were used. The monomer phase was fed to the droplet generator at a flow rate of 36 ml/minute. The membrane was vibrated at 68 Hz with a 0.8 mm peak to peak amplitude. The polymerization and post treatment stages were the same as in example 1.

Table 3 illustrates the average particle size measurements obtained in for samples prepared in Example 3.

TABLE 3

| Particle Size Distribution (Volume %) | | |
|---|---|---|
| | Emulsion Polymerization (Sample No. 1) | Example 3 (75 μm) |
| Average Vol. Particle Size | 75 | 75 |
| U.C. D60/D10 | 1.40 | 1.16 |
| U.C. D90/D10 | 1.66 | 1.33 |
| CV(%) | 29 | 17 |

As evidenced by the particle size distribution recorded in Table 3, the beads prepared by the present invention (e.g., polymer) exhibit excellent uniformity, particularly compared with conventionally prepared beads made by emulsion polymerization.

Example 4

Preparation of Uniform Macroporous Polymer Beads (50 μm Volume Ave. Diameter)

In Example 4, the same monomer and aqueous phases and membrane apparatus described in Example 1 were used. The monomer phase was fed to the droplet generator at a flow rate of 36 ml/minute. The membrane was vibrated at 74 Hz with a 1.6 mm peak to peak amplitude. The polymerization and post treatment stages were the same as in Example 1.

Table 4 illustrates the average particle size measurements obtained in for samples prepared in Example 4.

TABLE 4

| Particle Size Distribution (Volume %) | | |
|---|---|---|
| | Emulsion Polymerization (Sample No. 1) | Example 4 (50 μm) |
| Average Vol. Particle Size | 50 | 50 |
| U.C. D60/D10 | 1.36 | 1.27 |
| U.C. D90/D10 | 1.53 | 1.40 |
| CV(%) | 38 | 27 |

As evidenced by the particle size distribution recorded in Table 4, the beads prepared by the present invention (e.g., polymer) exhibit excellent uniformity, particularly compared with conventionally prepared beads made by emulsion polymerization.

Example 5

Preparation of Uniform Gel Polymer Beads (75 μm Volume Ave. Diameter)

In Example 5, the same monomer and aqueous phases and membrane apparatus described in Example 1 were used. An aqueous phase was prepared at neutral pH with a viscosity of 1 to 1.5 centipoise containing:

| Distilled water | 1 kg |
|---|---|
| Polyvinyl alcohol | 5 g |
| Salt (NaCl) | 20 g |

The aqueous solution of polyvinyl alcohol and salt specified above was added to the aqueous feed tank 32 and mixed at room temperature under agitation.

A monomer phase was prepared containing:

| Divinylbenzene (63%) | 0.127 kg |
|---|---|
| Styrene | 0.873 kg |
| Benzoyl Peroxide | 2 g |

The monomer phase comprising divinylbenzene, styrene and benzoyl peroxide was prepared in monomer mix tank 38 under agitation. The monomer phase was then fed to the droplet generator at a flow rate of 55 ml/minute. The membrane was vibrated at 66 Hz and 1.1 mm peak to peak amplitude.

The membrane was vibrationally excited to a frequency of 18 Hz as the monomer phase was dispersed in the suspension phase, forming a plurality of monomer droplets in the suspension phase.

The resultant droplet emulsion was then fed into reactor 350 under agitation sufficient to suspend the droplets without resizing the droplets. The reactor was then heated to a reaction temperature of 80° C. over 4 hours and then 88° C. over 2 hours and polymerized to >95% conversion of monomer to polymer. After separating the polymer beads from the aqueous phase and washing the beads, the following properties were noted: Volume average particle diameter 75 μm, and a uniformity coefficient of 1.11.

The polymer beads were then post-treated by washing with hot distilled water (3× bed volume) and cold distilled water (5× bed volume). The beads were dried in a fluid bed drier at 80° C. for 2 hours.

The polymer (75 μm) beads were found to exhibit the particle size distribution shown in Table 5. For purposes of comparison, the particle size distribution of spheroidal polymer beads (Sample No. 1) prepared using conventional methods is also set forth in Table 5.

TABLE 5

| Particle Size Distribution (Volume %) | | |
|---|---|---|
| | Emulsion Polymerization (Sample No. 1) | Example 5 (75 μm) |
| Average Vol. Particle Size | 75 | 75 |
| U.C. D60/D10 | 1.28 | 1.11 |
| U.C. D90/D10 | 1.51 | 1.27 |
| CV(%) | 22.2 | 11.7 |

The invention claimed is:
1. A method for preparing spheroidal polymer beads having a volume average particle diameter of about 10 to about 180 μm, the method comprising the steps of:
providing an apparatus comprising a metallic membrane containing a plurality of through holes, said through holes being conical or in the shape of a slot, wherein a first volume is in contact with a first side of the membrane and a second volume is in contact with a second side of the membrane, the first volume comprising a polymerizable monomer phase, the second volume comprising an aqueous liquid immiscible with the polymerizable monomer phase;

dispersing the first volume through the through holes into the second volume under conditions sufficient to form a plurality of monomer droplets comprising the polymerizable monomer, wherein a shear force is provided at a point of egression of the first volume into the second volume, the direction of shear substantially perpendicular to the direction of egression of the first volume, and the shear force is provided by displacing the membrane relative to the second volume; and polymerizing the droplets dispersed in the second volume.

2. The method according to claim 1, wherein the polymer beads exhibit a volume average particle diameter of about 35 to about 150 µm.

3. The method according to claim 1, wherein the beads have a particle size distribution having a uniformity coefficient of less than 1.3.

4. The method according to claim 1, wherein the displacing is rotating, pulsing, or oscillating movement.

5. The method according to claim 1, wherein the first volume is dispersed into the second volume by applying pressure to the first volume.

6. The method according to claim 1, wherein the monomer phase is directed into the aqueous liquid by pumping the first volume through the membrane.

7. The method according to claim 1, wherein the membrane is substantially metallic.

8. The method according to claim 7, wherein the membrane is wholly metallic.

9. The method according to claim 7, wherein the membrane comprises nickel.

10. The method according to claim 1, wherein the slot-shaped through holes have an aspect ratio of slot width to slot length of at least 1:2.

11. The method according to claim 1, wherein the polymerizable monomer phase comprises at least one monomer selected from styrene, divinylbenzene, and methacrylate.

12. The method according to claim 1, wherein the polymerizable monomer phase comprises divinylbenzene.

13. The method according to claim 1, wherein the polymerizable monomer phase comprises a porogen.

14. The method according to claim 13, wherein the porogen is an aliphatic alcohol.

15. The method according to claim 14, wherein the aliphatic alcohol is isobutyl alcohol.

16. The method according to claim 1, wherein the aqueous liquid comprises a viscosity modifier.

17. The method according to claim 16, wherein the viscosity modifier is polyvinyl alcohol.

18. The method according to claim 1, wherein the metallic membrane comprises nickel, the monomer phase comprises divinylbenzene and isobutyl alcohol and the aqueous liquid comprises polyvinylalcohol.

* * * * *